(12) United States Patent
Bestle

(10) Patent No.: US 8,607,415 B2
(45) Date of Patent: Dec. 17, 2013

(54) HINGE APPARATUS FOR A FOLDABLE ELECTRONIC DEVICE

(75) Inventor: Nikolaj Bestle, Copenhagen (DK)

(73) Assignee: Nokia Corporation, Espoo (FI)

( * ) Notice: Subject to any disclaimer, the term of this patent is extended or adjusted under 35 U.S.C. 154(b) by 974 days.

(21) Appl. No.: 12/521,095

(22) PCT Filed: Dec. 28, 2006

(86) PCT No.: PCT/EP2006/012653
§ 371 (c)(1),
(2), (4) Date: Jun. 24, 2009

(87) PCT Pub. No.: WO2008/080432
PCT Pub. Date: Jul. 10, 2008

(65) Prior Publication Data
US 2010/0084951 A1   Apr. 8, 2010

(51) Int. Cl.
*E05F 1/08* (2006.01)
(52) U.S. Cl.
USPC ........ 16/286; 16/281; 379/433.13; 455/575.3
(58) Field of Classification Search
USPC ........... 16/286, 287, 293, 294, 277, 281, 291, 16/345, 297, 282, 302, 366; 455/575.3, 455/575.4; 379/433.12, 433.13; 361/679.27
See application file for complete search history.

(56) References Cited

U.S. PATENT DOCUMENTS

| | | | | |
|---|---|---|---|---|
| 4,172,660 A * | 10/1979 | Yanofsky et al. | ................ | 355/75 |
| 6,826,043 B2 * | 11/2004 | Chang | ...................... | 361/679.27 |
| 6,930,881 B2 * | 8/2005 | Karidis et al. | ........... | 361/679.55 |
| 7,448,872 B2 * | 11/2008 | Im | ................................... | 439/10 |
| 7,499,264 B2 * | 3/2009 | Kemppinen | ............. | 361/679.27 |
| 7,586,539 B2 * | 9/2009 | Chiang | ........................ | 348/376 |
| 7,594,299 B2 * | 9/2009 | Kilpinen | ........................ | 16/225 |
| 7,627,337 B2 * | 12/2009 | Maatta et al. | ............... | 455/550.1 |
| 8,029,309 B2 * | 10/2011 | Ou et al. | ....................... | 439/374 |
| 2005/0044665 A1 | 3/2005 | Kuramochi | | |

FOREIGN PATENT DOCUMENTS

| | | |
|---|---|---|
| EP | 1107091 A | 6/2001 |
| EP | 1439685 A1 | 7/2004 |
| WO | 01/60030 A | 8/2001 |

OTHER PUBLICATIONS

"International Search Report and the Written Opinion of the International Searching Authority", received in corresponding PCT Application No. PCT/EP2006/012653, Dated Aug. 28, 2007, 11 pages.

* cited by examiner

*Primary Examiner* — William Miller
(74) *Attorney, Agent, or Firm* — Harrington & Smith

(57) ABSTRACT

An apparatus (10) for an electronic device, the apparatus comprising a first housing (12) having a first face (14) and a second housing (11) having a first face (13), the apparatus comprising a hinge (15) arranged towards the edge of the first faces to allow the first faces to be folded towards and away from one another between respective closed and open configurations of the apparatus, the apparatus comprising a biasing mechanism (17) arranged to bias the apparatus between the open and closed configurations, the biasing mechanism comprised with the first and/or second housings and not with the hinge.

17 Claims, 4 Drawing Sheets

HINGE APPARATUS FOR A FOLDABLE ELECTRONIC DEVICE

RELATED APPLICATION

This application was originally filed as PCT Application No. PCT/EP2006/012653 filed Dec. 28, 2006.

The invention relates to an apparatus for an electronic device, in particular for a foldable mobile electronic device such as a hand-portable radio telephone.

BACKGROUND

In the field of mobile telecommunications, various mechanisms are known that allow for foldable devices such as hand-portable radiotelephones. Such devices typically have a cylindrical hinge connecting two parts in a 'clamshell' arrangement. The hinge element typically divides a display and user input features, for example by separating a screen from a keypad.

Since the hinge element in a typical device houses a mechanism that provides a degree of holding capability in the open and closed configurations, together with necessary electrical connections, this results in a lower limit to the possible diameter ranges for the hinge element.

To improve the appearance of a hand-portable radiotelephone, it is desirable to hide or reduce the appearance of the hinge element. This is possible through miniaturisation of mechanical components within the hinge element. However, reducing the diameter below around 5-6 mm is particularly challenging.

It is an object of the present invention to overcome or alleviate some or all of the above problems.

The listing or discussion of a prior-published document in this specification should not necessarily be taken as an acknowledgement that the document is part of the state of the art or is common general knowledge.

SUMMARY

According to the invention, there is provided an apparatus for an electronic device, the apparatus comprising a first housing having a first face and a second housing having a first face, the apparatus comprising a hinge arranged towards the edge of the first faces to allow the first faces to be folded towards and away from one another between respective closed and open configurations of the apparatus, the apparatus comprising a biasing mechanism arranged to bias the apparatus between the open and closed configurations, the biasing mechanism comprised with the first and/or second housings and not with the hinge.

In this way, apparatus of the invention may have a reduced diameter of hinge below that typically possible with previous solutions, while still retaining the required capability of maintaining a bias in the open and/or closed configurations.

According to another aspect of the invention, there is provided a method of opening/closing an apparatus for an electronic device between open and closed configurations, the apparatus comprising a first housing having a first face and a second housing having a first face, the apparatus comprising a hinge arranged towards the edge of the first faces to allow the first faces to be folded towards and away from one another between respective closed and open configurations of the apparatus, the apparatus comprising a biasing mechanism arranged to bias the apparatus between the open and closed configurations, the biasing mechanism comprised with the first and/or second housings and not with the hinge, the method comprising acting against the bias of the biasing mechanism to open the apparatus from the closed configuration towards the open configuration and acting against the bias to close the apparatus from the open configuration to the closed configuration.

According to another aspect of the invention, there is provided an apparatus for an electronic device, the apparatus comprising a first means for housing having a first face and a second means for housing having a first face, the apparatus comprising a means for hinging arranged towards the edge of the first faces to allow the first faces to be folded towards and away from one another between respective closed and open configurations of the apparatus, the apparatus comprising a means for biasing arranged to bias the apparatus between the open and closed configurations, the means for biasing comprised with the first and/or second housings and not with the hinge.

The present invention includes one or more aspects, embodiments and/or features of said aspects and/or embodiments in isolation and/or in various combinations whether or not specifically stated (including claimed) in that combination or in isolation.

BRIEF DESCRIPTION OF THE DRAWINGS

A description is now given, by way of example only, with reference to the accompanying drawings, in which.

DETAILED DESCRIPTION

Figure 1:
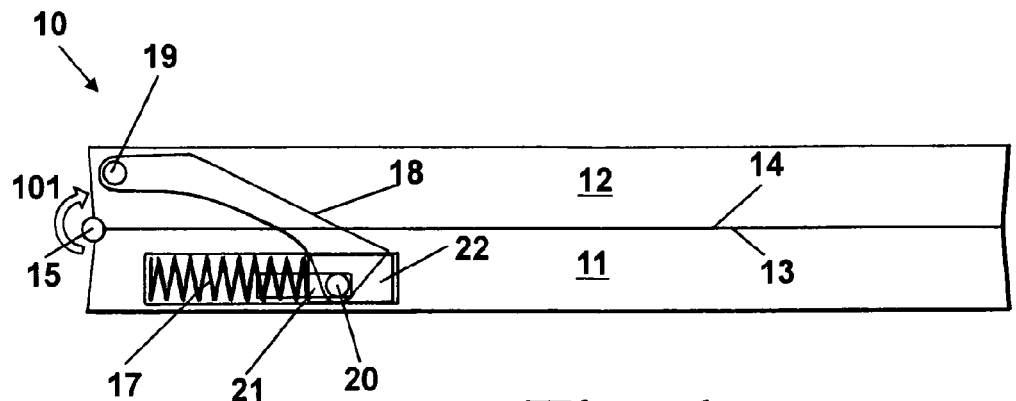
FIG. 1 is a cut-away schematic side view of a foldable apparatus for an electronic device in a closed configuration.

Apparatus in the form of casing and associated mechanical parts of a hand-portable radiotelephone is shown in FIG. 1 in a partially cut-away schematic side view. The apparatus 10 comprises a first housing 12 and a second housing 11. A first face 14 of the first housing 12 and a first face 13 of the second housing 11 are adjacent and facing one another in the illustrated fully closed configuration. A hinge 15 is provided at an edge of the faces 13, 14 to allow them to be folded towards and away from one another between open and closed configurations.

A linkage element 18 links the first and second housings 12, 11 by means of a fixed pivot 19 on the first housing 12 and a sliding pivot 20 in the second housing 11. The sliding pivot 20 is mounted on a slider 22 arranged to slide towards and away from the hinge 15, movement of the slider 22 towards the hinge tending to increase a bias on a biasing mechanism comprising a helical compression spring 17 provided in the second housing 11. The spring 17 thereby urges the slider 22 away from the hinge 15. The sliding pivot 20 is mounted in a slot 21 to allow the pivot to slide towards and away from the hinge 15, the slot 21 being oriented parallel to the face 13 of the second housing 11.

The fixed pivot 19 and sliding pivot 20 are linked by a linkage element 18. This linkage element may be a thin rigid plate, which possesses sufficient rigidity to translate the force urged by the spring 17 on the slider 22 into a closing force between the first and second housings 12, 11, thus bringing the faces 13, 14 together. In the illustrated fully closed configuration the force exerted by the spring 17 acts away from the hinge, and is translated into a rotational moment 101 acting on the first housing 12 about the hinge 15 by action on the linkage element 18 and the fixed pivot 19.

Figure 2:
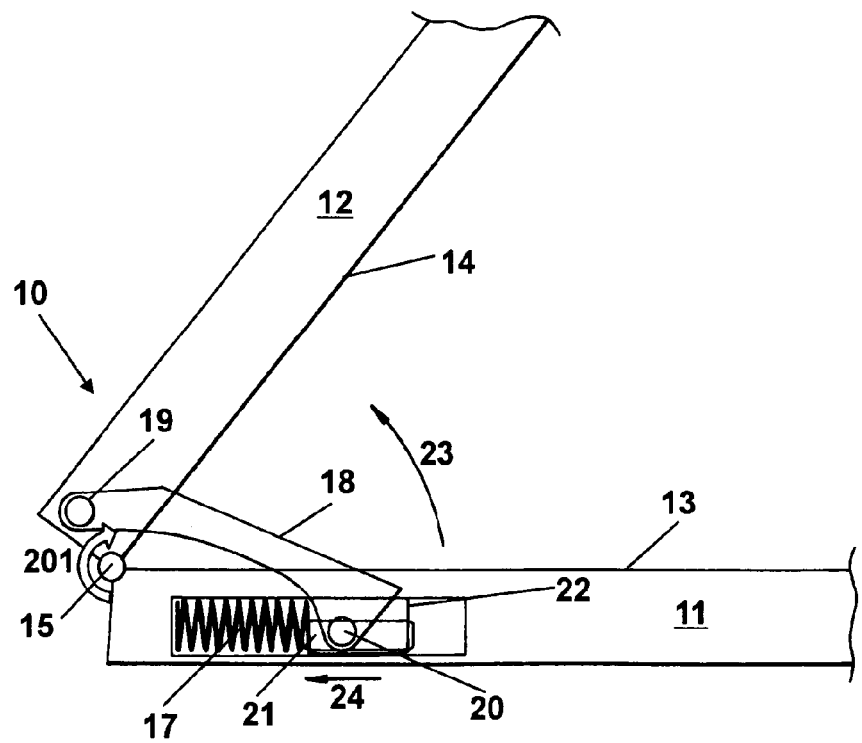
FIG. 2 is a cut-away schematic side view of a foldable apparatus for an electronic device in a partially opened configuration.

Shown in FIG. 2 is the apparatus of FIG. 1 when in a partially open configuration. As the first face 14 is rotated in the direction indicated by arrow 23 away from the second face 13 about the hinge 15, the pivots 19, 20 and the linkage element 18 act to compress the spring 17 in the direction indicated by arrow 24. A force therefore needs to be exerted on the first and second housings 11, 12 about the hinge 15 to counteract the rotational moment 201 in order to open the apparatus from the fully closed configuration towards the partially open configuration of FIG. 2.

As the first housing 12 continues to rotate in the direction 23, the fixed pivot 19 passes a point where the fixed pivot 19, the hinge 15 and the sliding pivot are in line with each other. This corresponds to a point of instability in the mechanism, where the rotational moment 201 reduces to zero. Further rotation in the direction 23 then causes the slider 22 to reverse direction, and causes the rotational moment acting on the first housing 12 to reverse direction, therefore tending towards further opening of the apparatus 10.

Figure 3:
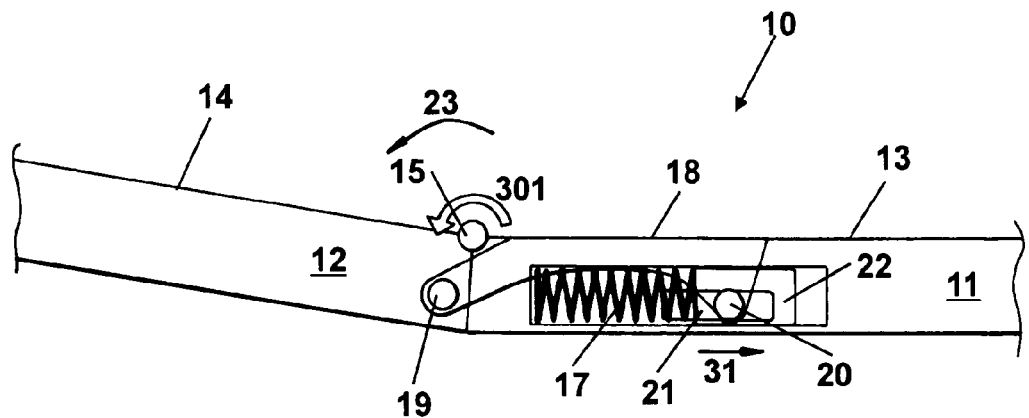
FIG. 3 is a cut-away schematic side view of a foldable apparatus for an electronic device in a fully opened configuration.

FIG. 3 shows the apparatus 10 in a fully opened configuration, where an angle formed between the first faces 13, 14 is greater than 90 degrees. The spring 17 has extended compared to its compressed state in FIG. 2, the slider 22 has moved away from the hinge 15, and a force from the spring 17 acting on the slider is transmitted by the linkage element 18 into a rotational moment 301 acting on the first housing 12 to bias the first and second housings 12, 11 in the opened configuration.

In a general aspect therefore, the biasing mechanism of the apparatus allows for a bistable mode of operation, where the biasing mechanism holds the first and second housings 12, 11 in an open and a closed configuration.

The hinge 15 may have a diameter of the order of 5 mm or below. Alternatively, the hinge 15 may have a diameter of the order of 4 mm or below, 3 mm or below, 2 mm or below or 1 mm or below. Alternatively, the hinge may have a diameter of the order of or below half the thickness, a third the thickness or a quarter of the thickness of the first and/or second housing 12, 11. The hinge may have a diameter of between 4 mm and 1 mm, or between 4 mm and 0.5 mm.

Figure 4:
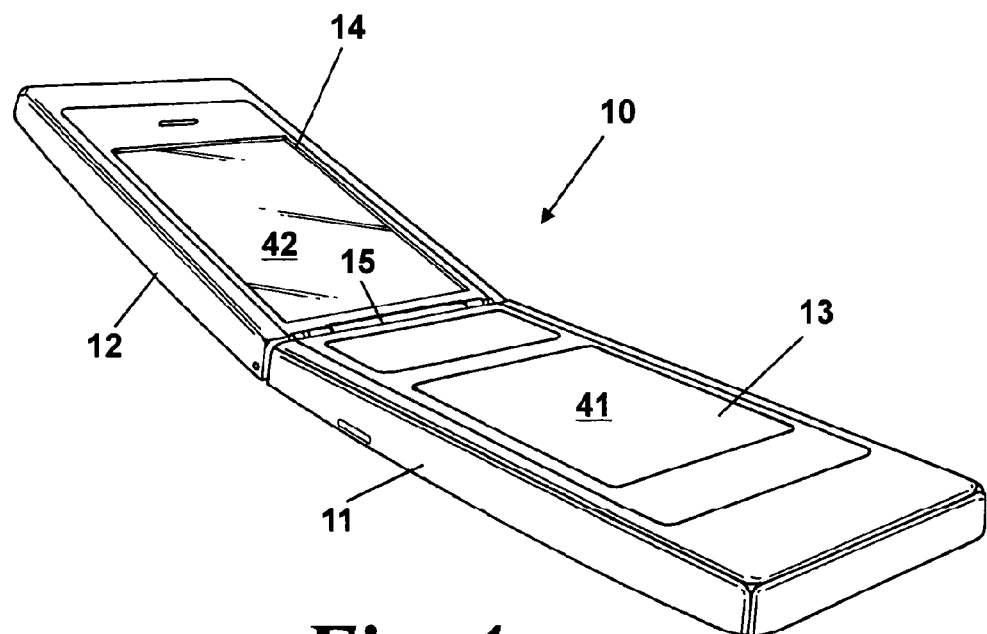
FIG. 4 is a perspective view of a foldable apparatus for an electronic device in a fully open configuration.

FIG. 4 illustrates an exemplary embodiment of an apparatus in a fully opened configuration corresponding to that shown in FIG. 3. The apparatus, in the form of a hand-portable radiotelephone comprises a screen 42 on the first face 14 of the first housing 12, and a keypad 41 on a first face 13 of the second housing 11. Only a portion of the hinge 15 is visible between the two faces 13, 14. The linkage element 18 is not visible in the opened configuration, as it is configured to be hidden in a recess largely within the side of the second housing 11.

Figure 5:
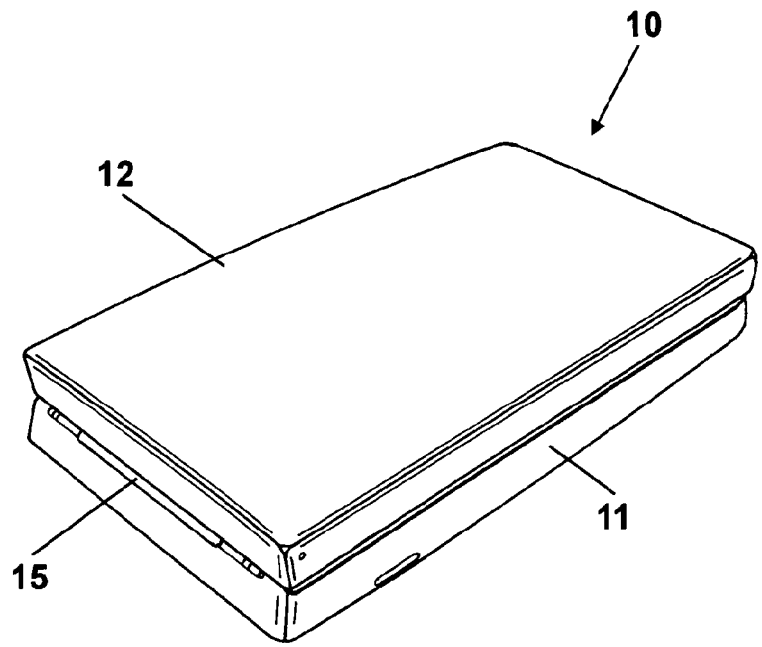
FIG. 5 is a perspective view of a foldable apparatus for an electronic device in a closed configuration.

Shown in FIG. 5 is the apparatus 10 of FIG. 4 when in a closed configuration. The hinge 15 is partially visible along the edge of the faces of the first and second housings 12, 11.

The linkage element is also not visible in this configuration, since it is hidden in recesses partly within the sides of the first and the second housings 12, 11. The recesses are provided by an extended split line between an inner frame and exterior cover of the housings 11, 12.

The linkage elements 18a, 18b may alternatively be provided on the outer sides of the apparatus, thus revealing rather than hiding the mechanism.

Figure 6:
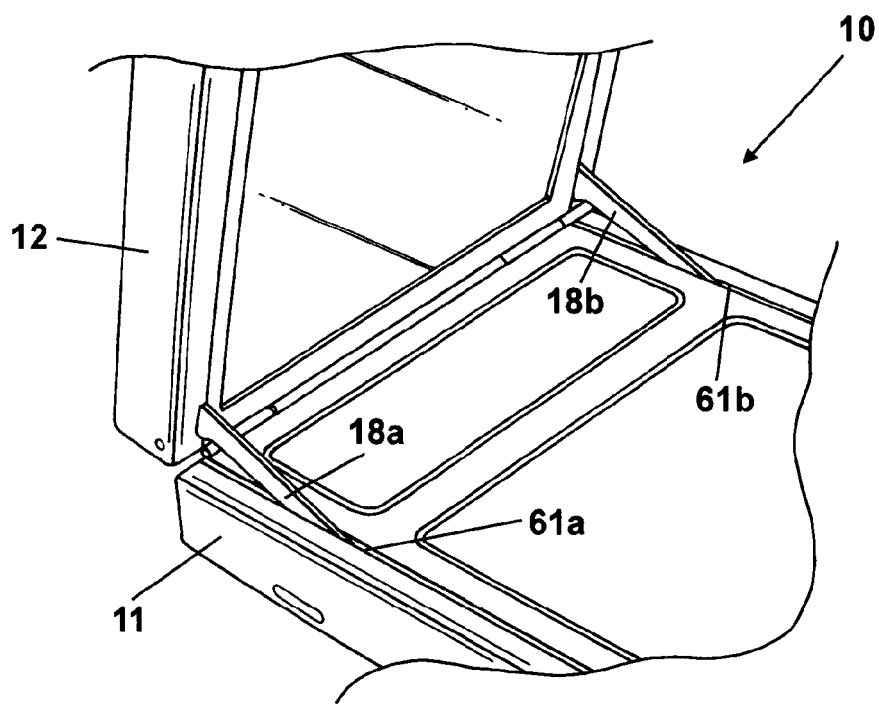
FIG. 6 is a perspective view of a hinged region of a foldable apparatus for an electronic device in a partially opened configuration.

Shown in FIG. 6 is the apparatus 10 in a partially opened configuration corresponding to that shown in FIG. 2. In the embodiment shown, linkage elements 18a, 18b are provided at opposing sides of the apparatus 10, to allow for increased stability in operation. It is to be understood, however, that one linkage element may be alternatively suitable for the purpose of the invention.

Only in the partially opened configuration are the linkage elements visible. This feature has the benefit of allowing a clean and uncluttered appearance to the apparatus when in the commonly used open or closed configurations.

Electrical connections between the first and second housings 11, 12 may be made by means of flexible circuit connections commonly used in such applications.

Figure 7:
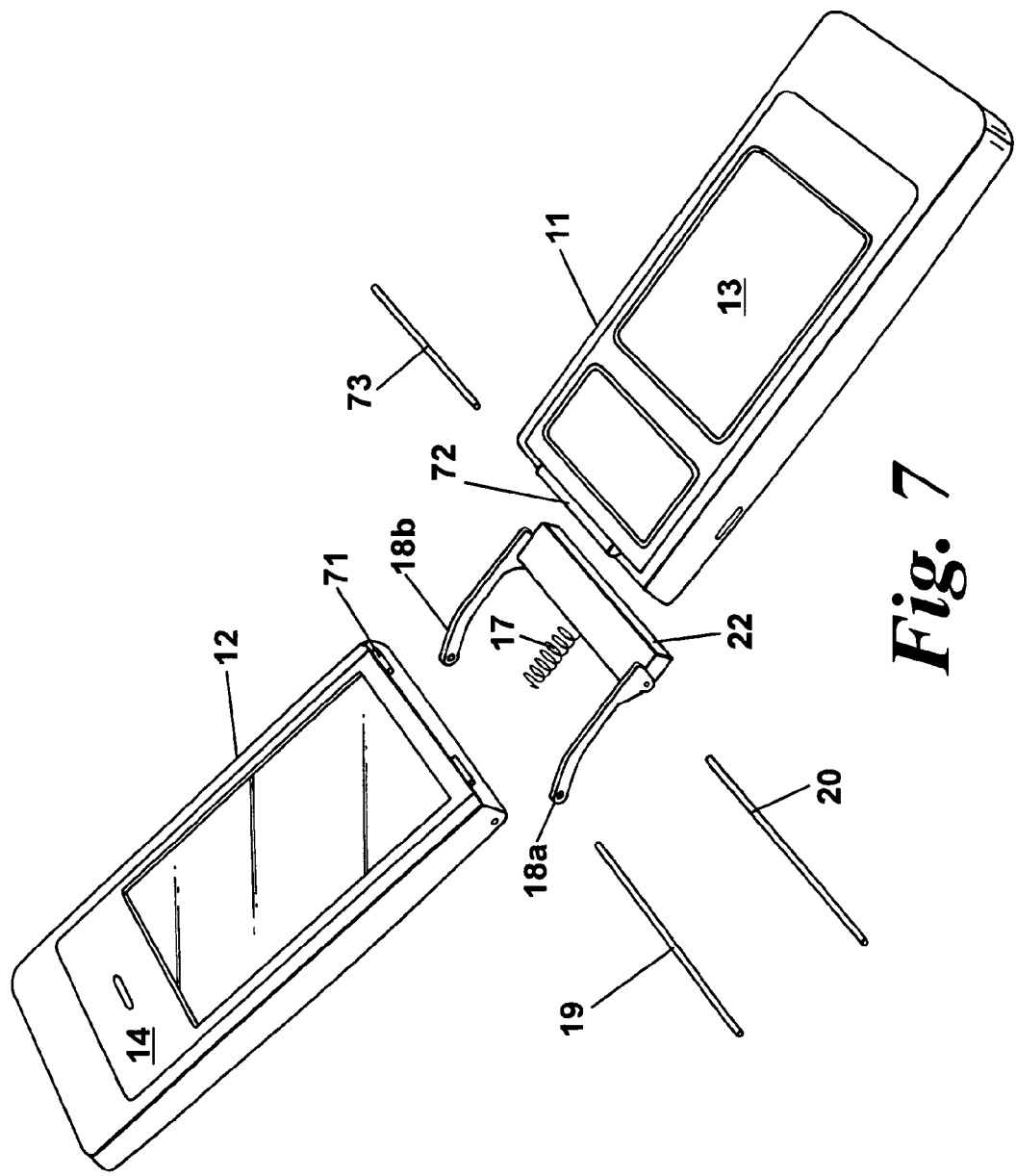
FIG. 7 is a partially exploded perspective view of a foldable apparatus for an electronic device.

FIG. 7 shows a partially exploded perspective view of an exemplary embodiment of the apparatus 10, with the biasing mechanism component parts illustrated. The hinge in the form of a tube and locking pin arrangement comprises a pair of hollow members 71 on an edge of the first face 14 of the first member 12 and a further hollow member 72 on an edge of the first face 13 of the second member 11. When assembled, a hinge pin 73 fits inside the hollow members 71, 72 and connects the edges of the first faces 13, 14.

By connecting the two housings 11, 12 with the tube and locking pin arrangement, the hinge can be reduced to a diameter below 2 mm and still have a robustness suitable for a hand-portable radiotelephone. For robustness, the tubes and/or the pins may be made from a metal such as steel, although other materials may be suitable. In an alternative embodiment, the hinge may be an integrally-formed part of a unitary housing arrangement, the hinge being a 'living hinge'. In this form, the unitary housing may be plastically formed such that the hinge comprises a thinned section able to flex sufficiently to allow a similar operation as the tube and pin arrangement. This embodiment may then allow for a continuous or seamless surface when the apparatus is in the opened configuration.

The faces 13, 14 of the apparatus may be formed as metal frames connected by an integrated hinge. The linkage elements 18a, 18b, spring 17 and slider 22 may also be fully integrated in the frame.

Further pins 19, 20 provide the fixed and sliding pivots shown previously. The sliding pivot pin 20 connects with the sliding member 22 and the second housing via the linkage elements 18a, 18b. The fixed pivot pin 19 connects with the first housing 11 via the linkage elements 18a, 18b.

The spring 17 illustrated may alternatively be any other suitable means for biasing the slider 22, such as a thin part of sheet metal sufficiently resilient to be flexed and provide the biasing force for the open and closed position.

One or more embodiments of the present invention are not limited to uses in which the hinge is small, and can be applied to comparatively large hinges (which may have a diameter above 6 mm).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a housing having a first face and a second housing having a first face, the apparatus comprising a hinge having a fixed axis of rotation and arranged towards adjacent edges of the first faces to allow the, first faces to be folded towards and away from one another between respective closed and open configurations of the apparatus, the apparatus comprising a biasing mechanism arranged to bias the apparatus between the open and closed configurations, wherein the biasing mechanism comprises a fixed pivot on the first housing, a slideable pivot on the second housing and a linkage between and linking the pivots.

2. An apparatus according to claim 1, wherein the hinge comprises a tube and locking pin arrangement.

3. An apparatus according to claim 1, wherein the hinge is arranged at the adjacent edges of the first faces.

4. An apparatus according to claim 1, wherein the hinge is arranged to extend along the adjacent edges of the first faces.

5. An apparatus according to claim 1, wherein the hinge has a diameter of the order of 6 mm or below 6 mm.

6. An apparatus according to claim 1, wherein the hinge has a diameter of the order of 5 mm or below 5 mm.

7. An apparatus according to claim 1, wherein the hinge has a diameter of the order of 4 mm or below 4 mm.

8. An apparatus according to claim 1, wherein the hinge has a diameter of the order of 3 mm or below 3 mm.

9. An apparatus according to claim 1, wherein the hinge has a diameter of the order of 2 mm or below 2 mm.

10. An apparatus according to claim 1, wherein the hinge has a diameter of the order of 1 mm or below 1 mm.

11. An apparatus according to claim 1, wherein the hinge has a diameter of the order of or below half the thickness of at least one of the first and second housing.

12. An apparatus comprising a housing having a first face and a second housing having a first face, the apparatus comprising a hinge having a stationary axis of rotation and arranged towards adjacent edges of the first faces to allow the first faces to be folded towards and away from one another between respective closed and open configurations of the apparatus, the apparatus comprising a biasing mechanism arranged to bias the apparatus between the open and closed configurations, wherein the biasing mechanism comprises a fixed pivot on the first housing and a slideable pivot on the second housing, the biasing mechanism arranged such that the slideable pivot is biased to slide in a plane parallel to the first face of the second housing and wherein the pivots are linked by a linkage element.

13. An apparatus comprising a housing having a first face and a second housing having a first face, the apparatus comprising a hinge having a fixed axis of rotation and arranged towards adjacent edges of the first faces to allow the first faces to be folded towards and away from one another between respective closed and open configurations of the apparatus, the apparatus comprising a biasing mechanism arranged to bias the apparatus between the open and closed configurations, wherein the biasing mechanism comprises a fixed pivot on the first housing and a slideable pivot on the second housing, the biasing mechanism arranged such that the slideable pivot is biased to slide in a plane parallel to the first face of the second housing and wherein the pivots are linked by a linkage element, located on either side of the slideable pivot.

14. An apparatus comprising a first face and a second housing having a first face, the apparatus comprising a hinge arranged towards adjacent edges of the first faces to allow the first faces to be folded towards and away from one another between respective closed and open configurations of the apparatus, the apparatus comprising a biasing mechanism arranged to bias the apparatus between the omen and closed configurations, wherein the biasing mechanism comprises a fixed pivot on the first housing, a slideable pivot on the second housing and a linkage between and linking the pivots, wherein the hinge is provided by a common element integral with both the first and second housings.

15. An apparatus according to claim 14, wherein the hinge is provided as part of a co-molded said first and second housing.

16. A method of opening/closing an apparatus between open and closed configurations, the apparatus comprising a first housing having a face and a second housing having a face, the apparatus comprising a hinge arranged towards adjacent edges of the faces to allow the faces to be folded towards and away from one another between the respective closed and open configurations of the apparatus, the apparatus comprising a biasing mechanism comprising a compression spring, a fixed pivot on the first housing, a slideable pivot on the second housing cooperating with the compression spring, and a linkage between and linking the pivots, where the compression spring is arranged to bias the apparatus between the open and closed configurations, the method comprising acting against the bias of the biasing mechanism to open the apparatus from the closed configuration towards the open configuration by initially compressing the compression spring and acting against the bias to close the apparatus from the open configuration to the closed configuration by initially compressing the compression spring.

17. An apparatus comprising a housing having a first face and a second housing having a first face, the apparatus comprising a hinge arranged towards adjacent edges of the first faces to allow the first faces to be folded towards and away from one another between respective closed and open configurations of the apparatus, the apparatus comprising a biasing mechanism arranged to bias the apparatus between the open and closed configurations, where the biasing mechanism comprises a fixed pivot on the first housing, a slideable pivot on the second housing, a linkage between and linking the pivots, and a compression spring, where the slideable pivot is biased by the compression spring on the second housing such that opening the apparatus from the closed configuration towards the open configuration is by initially compressing the compression spring, and closing the apparatus from the open configuration to the closed configuration is by initially compressing the compression spring.

* * * * *

UNITED STATES PATENT AND TRADEMARK OFFICE
CERTIFICATE OF CORRECTION

PATENT NO. : 8,607,415 B2
APPLICATION NO. : 12/521095
DATED : December 17, 2013
INVENTOR(S) : Nicolaj Bestle It is certified that error appears in the above-identified patent and that said Letters Patent is hereby corrected as shown below:

In the Claims

In Claim 1:
Column 5, line 39, "the," should be deleted and --the-- should be inserted.

In Claim 14:
Column 6, line 29, "a first" should be deleted and --a housing having a first-- should be inserted.

In Claim 14:
Column 6, line 35, "omen" should be deleted and --open-- should be inserted.

Signed and Sealed this
Twenty-fifth Day of March, 2014

Michelle K. Lee
*Deputy Director of the United States Patent and Trademark Office*